(12) United States Patent
Lee et al.

(10) Patent No.: US 8,389,632 B2
(45) Date of Patent: Mar. 5, 2013

(54) CO-CONTINUOUS HETEROPHASE POLYMER COMPOSITIONS CONTAINING HIGH MELT STRENGTH POLYPROPYLENE FOR EXTRUSION COATING

(75) Inventors: Chun Lee, Cincinnati, OH (US); Charles S. Holland, Springboro, OH (US); James R. Beren, West Chester, PA (US); Anthony J. De Nicola, Jr., Newark, DE (US)

(73) Assignee: Equistar Chemicals, LP, Houston, TX (US)

( * ) Notice: Subject to any disclaimer, the term of this patent is extended or adjusted under 35 U.S.C. 154(b) by 16 days.

(21) Appl. No.: 13/024,053

(22) Filed: Feb. 9, 2011

(65) Prior Publication Data

US 2012/0202933 A1    Aug. 9, 2012

(51) Int. Cl.
*C08F 8/00*    (2006.01)
*C08L 9/00*    (2006.01)
*C08L 23/04*   (2006.01)
*C08L 23/10*   (2006.01)

(52) U.S. Cl. .................. 525/191; 525/232; 525/240

(58) Field of Classification Search .................. 525/191, 525/232, 240
See application file for complete search history.

(56) References Cited

U.S. PATENT DOCUMENTS

| 5,122,593 | A | 6/1992 | Jennings et al. |
| 5,414,027 | A * | 5/1995 | DeNicola et al. ............. 522/112 |
| 7,683,129 | B2 | 3/2010 | Mehta et al. |
| 2004/0102550 | A1 | 5/2004 | Dang et al. |

FOREIGN PATENT DOCUMENTS

EP    0634454 A1    1/1995

OTHER PUBLICATIONS

PCT International Search Report and the Written Opinion—Mailed May 16, 2012 for Corresponding PCT/US2012/024497.

* cited by examiner

*Primary Examiner* — Nathan M Nutter

(57) ABSTRACT

A process of extruding a blend of an irradiated extrudate of a first propylene polymer and a non-irradiated second propylene polymer, where the first propylene polymer comprises a non-phenolic stabilizer. The irradiation of the first propylene polymer extrudate is conducted in a reduced oxygen environment, and the irradiated extrudate of the first propylene polymer and the non-irradiated second propylene polymer are blended at a temperature below their respective melting points. The blend has an ARPSW of $\leq 3.0$ micron.

20 Claims, 2 Drawing Sheets

CO-CONTINUOUS HETEROPHASE POLYMER COMPOSITIONS CONTAINING HIGH MELT STRENGTH POLYPROPYLENE FOR EXTRUSION COATING

FIELD OF THE INVENTION

The present invention relates to a composition for improved extrusion coating processes. More particularly, the present invention relates to a blend of irradiated extrudates of polypropylene and non-irradiated polypropylene having a co-continuous phase structure for use in extrusion processes.

BACKGROUND OF THE INVENTION

The use of low density polyethylene in extrusion coating onto substrates such as paper and metal foils has historically been favored over that of polypropylene. This is a result of the relative poor extrusion coating characteristics of conventional polypropylenes at high throughput rates, where extension of the polymer melt through the extruder die increases. Conventional polypropylenes don't well-tolerate the higher extension, which adversely affects the orientation of the polymer melt, as evidenced by neck-in, draw resonance, edge weave and poor film quality.

Stabilizing additives are typically added to propylene polymer compositions to protect against degradation due to oxidation involving heat, UV radiation, ionizing radiation and transition metal impurities. In particular, in extrusion coating, fouling of the die or nip roll due to degradation products can occur if an appropriate level of stabilization is not present, potentially resulting in a shutdown of the extrusion coating product line. This is particularly important at higher extrusion temperatures. In addition to unit downtime, degradation can result in color development, undesirable taste or odor in the resulting polypropylene. Finally, appropriate stabilization levels are important to prevent large melt flow shifts at the operating temperature and residence time of the extruder, and to reduce the sensitivity of the extrusion coating operation to changes in operating conditions, e.g., extruder temperature, screw rpm, backpressure at the die, etc. Additives to inhibit degradation include free radical traps, the so-called primary antioxidants, and peroxide decomposers, sometimes referred to as secondary antioxidants. Hindered phenols and hindered amines are typical free-radical traps. Phosphites and thioesters are examples of peroxide decomposers. Phosphites are effective in the melt phase, and are used to prevent color generation. Thioesters are used for thermal stabilization to control undesirable taste and odor development in the polypropylene. They are effective in the solid phase.

Increasing the melt strength of the polypropylene is known to improve melt orientation. Techniques to improve melt strength in polypropylene have included irradiation of conventional flake polypropylene in reduced-oxygen environments, as described, for example, in U.S. Pat. Nos. 4,916,198, 5,047,485, 5,414,027, 5,541,236, 5,554,668, 5,591,785, 5,731,362, and 5,804,304. For example, U.S. Pat. No. 5,508, 318 discloses compounded blends of irradiated and non-irradiated olefin polymer materials suitable for extrusion coating applications requiring low gloss. These irradiation methods increase propylene polymer melt strength by creating polymer radicals during irradiation which then re-combine to form long-chain branches in the reduced oxygen environment. Conventionally, phenolic antioxidants have long been used to improve polymer stability under elevated temperature conditions, such as those typically experienced during extrusion, or during extended periods of storage. However, their use in irradiated compositions undermines enhanced melt strength by scavenging free radicals, thereby reducing the number of polymeric free radicals available to recombine to form long-chain branches. Moreover, irradiation of phenolic antioxidant-containing polymers can result in the formation of degradation products that impart undesirable color. Non-phenolic stabilizers have been used in the irradiation of conventional polyolefin materials to avoid such problems, as described in U.S. Pat. No. 6,664,317. International Publication No. WO 2009/003930 discloses irradiation of high melt strength polypropylene in the form of pellets containing non-phenolic antioxidants. However, a continuing need exists for extrusion coating processes that provide good film quality at high line speeds.

SUMMARY OF THE INVENTION

The present disclosure relates to a composition made up of a blend of an irradiated first propylene polymer having a non-phenolic stabilizer and a non-irradiated second propylene polymer. The irradiation of the first propylene polymer was conducted in a reduced oxygen environment, and wherein the additives in the non-irradiated propylene polymer are present in the composition at no more than 0.22 pph. In further embodiments, the irradiated first propylene polymer and the non-irradiated second propylene polymer were blended at a temperature below the melting point of the first and second propylene polymers. Further, the blend has an averaged rubber phase size width ("ARPSW") of $\leq 3.0$ micron after melt phase extrusion.

The present invention relates to a process of extruding a blend of an irradiated first propylene polymer having a non-phenolic stabilizer and a non-irradiated second propylene polymer. The irradiation of the first propylene polymer was conducted in a reduced oxygen environment, and the irradiated first propylene polymer and the non-irradiated second propylene polymer were blended at a temperature below the melting point of the first and second propylene polymers. Further, the melt phase extrudate of the blend has an ARPSW of $\leq 3.0$ micron after melt phase extrusion. In some embodiments the additives in the non-irradiated propylene polymer are present in the composition at no more than 0.22 pph.

In other embodiments the present disclosure relates to a process of blending an irradiated first propylene polymer comprising a non-phenolic stabilizer, and a non-irradiated second propylene polymer, at a temperature below the melting point of the first and second propylene polymers, thereby forming a polymer blend. The irradiation of the first propylene polymer was conducted in a reduced oxygen environment. The process further includes extruding the polymer blend to form a film and coating the film onto a substrate selected from paper, paperboard, fabrics or metal foils. Further, the blend has an ARPSW of $\leq 3.0$ micron after melt phase extrusion.

In additional embodiments, the present disclosure relates to a process for preparing a polymer composition including blending an irradiated first propylene polymer having a non-phenolic stabilizer with a non-irradiated second propylene polymer, wherein the irradiation of the first propylene polymer was conducted in a reduced oxygen environment. Further, the irradiated first propylene polymer and the non-irradiated second propylene polymer were blended at a temperature below the melting point of the first and second propylene polymers. Further, the blend has an ARPSW of $\leq 3.0$ micron after melt phase extrusion. In some embodiments the additives in the non-irradiated propylene polymer are present in the composition at no more than 0.22 pph.

In some embodiments the second propylene polymer is selected from:

(e) an olefin polymer composition comprising:
  (i) about 10 parts to about 60 parts by weight of a crystalline propylene homopolymer having xylene insolubles of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and xylene insolubles greater than about 60%;
  (ii) about 3 parts to about 25 parts by weight of a copolymer of ethylene and propylene, or ethylene and a $C_4$-$C_{10}$ α-olefin, where the copolymer is insoluble in xylene at ambient temperature; and
  (iii) about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;
wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages,
(f) a thermoplastic olefin comprising:
  (i) about 10% to about 60% by weight of a propylene homopolymer having xylene insolubles of at least 80%, or a crystalline copolymer selected from the group consisting of (a) ethylene and propylene, (b) ethylene, propylene and a $C_4$-$C_{10}$ α-olefin, and (c) ethylene and a $C_4$-$C_{10}$ α-olefin, the crystalline copolymer comprising a propylene content greater than 85% by weight and xylene insolubles greater than 60%;
  (ii) about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and
  (iii) about 3% to about 40% by weight of a copolymer of ethylene and propylene or a copolymer of ethylene and an α-olefin, wherein the copolymer is insoluble in xylene at ambient temperature; or
(g) mixtures thereof,

DETAILED DESCRIPTION OF THE INVENTION

Figure 1:
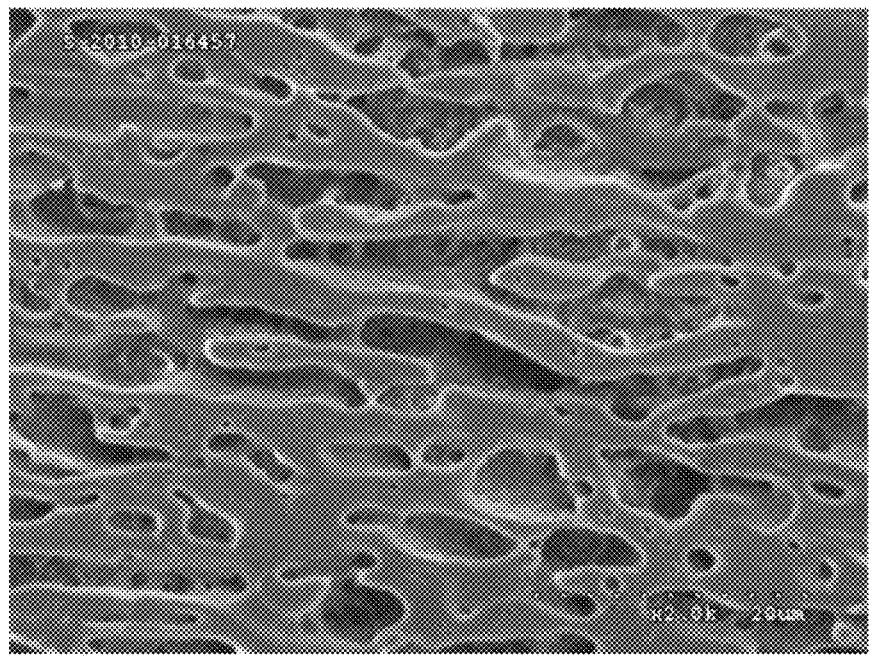
FIG. 1 illustrates a SEM micrograph of a cross-section of Comparative Example 1, showing its phase morphology.

Propylene Polymer Compositions
The first propylene polymer includes a non-phenolic stabilizer and a propylene polymer, wherein the first propylene polymer is selected from (a), (b) or (c) as follows:
  (a) a crystalline propylene homopolymer having a xylene insolubles greater than 80%, preferably greater than 85%,
  (b) a crystalline random copolymer comprising propylene and an olefin selected from the group consisting of ethylene and a $C_4$-$C_{10}$ α-olefin, having xylene insolubles greater than 80%, preferably greater than 82%, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight,
  (c) a crystalline random terpolymer comprising propylene and two olefins selected from the group consisting of ethylene, $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight; and
  (d) mixtures thereof.

The second propylene polymer is selected from (e), (f) or (g) as follows:
  (e) an olefin polymer composition comprising:
    (i) about 10 parts to about 60 parts by weight of a crystalline propylene homopolymer having xylene insolubles of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and xylene insolubles greater than about 60%;
    (ii) about 3 parts to about 25 parts by weight of a copolymer of ethylene and propylene, or ethylene and a $C_4$-$C_{10}$ α-olefin, where the copolymer is insoluble in xylene at ambient temperature; and
    (iii) about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene,
  wherein the elastomeric copolymer is soluble in xylene at ambient temperature and comprises an intrinsic viscosity of about 1.5 to about 4.0 dl/g;
  wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages,
  (f) a thermoplastic olefin comprising:
    (i) about 10% to about 60% by weight of a propylene homopolymer having xylene insolubles of at least 80%, or a crystalline copolymer selected from the group consisting of (a) ethylene and propylene, (b) ethylene, propylene and a $C_4$-$C_{10}$ α-olefin, and (c)

ethylene and a $C_4$-$C_{10}$ α-olefin, the crystalline copolymer comprising a propylene content greater than 85% by weight and xylene insolubles greater than 60%;

(ii) about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and (iii) about 3% to about 40% by weight of a copolymer of ethylene and propylene or a copolymer of ethylene and an α-olefin, wherein the copolymer is insoluble in xylene at ambient temperature; or (g) mixtures thereof.

Preferably, the first propylene polymer is selected from a crystalline propylene homopolymer, a crystalline random copolymer of propylene and an olefin selected from the group consisting of ethylene and $C_4$-$C_{10}$ α-olefins or mixtures thereof. More preferably, the first propylene polymer is a crystalline propylene homopolymer or a crystalline copolymer of propylene and ethylene. Most preferably, the first propylene polymer is a crystalline propylene homopolymer.

Preferably, the second propylene polymer is selected from an olefin polymer composition comprising (i) about 10 parts to about 60 parts by weight of a crystalline propylene homopolymer having xylene insolubles of at least 80%, or a crystalline copolymer selected from the group consisting of propylene and ethylene, the crystalline copolymer comprising a propylene content greater than 85% by weight and xylene insolubles greater than 60%, (ii) about 3 parts to about 25 parts by weight of a copolymer of ethylene and propylene where the copolymer is insoluble in xylene at ambient temperature; and (iii) about 10 parts to about 80 parts by weight of an elastomeric copolymer selected from the group consisting of ethylene and propylene, wherein the elastomeric copolymer is soluble in xylene at ambient temperature and comprises an intrinsic viscosity of about 1.5 to about 4.0 dl/g; wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages; or a thermoplastic olefin comprising: (i) about 10% to about 60% by weight of a propylene homopolymer having xylene insolubles of at least 80%, or a crystalline copolymer consisting of ethylene and propylene, the crystalline copolymer comprising a propylene content greater than 85% by weight and xylene insolubles greater than 60%, (ii) about 20% to about 60% by weight of an amorphous copolymer of ethylene and propylene, the amorphous copolymer comprising less than 70% by weight of ethylene and is soluble in xylene at ambient temperature; and (iii) about 3% to about 40% by weight of a copolymer of ethylene and propylene, wherein the copolymer is insoluble in xylene at ambient temperature.

The first propylene polymer preferably has a melt flow rate of 0.1 to 100 dg/min, more preferably 0.15 to 30 dg/min, most preferably 0.2 to 15 dg/min. The second propylene polymer preferably has a melt flow rate of 0.1 to 100 dg/min, more preferably 0.5 to 50 dg/min, most preferably 1 to 35 dg/min.

The blend of the irradiated extrudate of the first propylene polymer and the non-irradiated second propylene polymer preferably contains 5 to 95 wt % of the irradiated extrudate of the first propylene polymer and 5 to 95 wt % of the non-irradiated second propylene polymer. More preferably, the blend contains 10 to 30 wt % of the irradiated extrudate of the first propylene polymer and 70 to 90 wt % of the non-irradiated second propylene polymer.

The first and second propylene polymers can be prepared by Ziegler-Natta or Single-Site (e.g. metallocene) catalysis. Polymerization methods are described in for example, International Publication No. WO 2009/003930. Further, processes for preparation of polymers (d) and (e) above is described in U.S. Pat. Nos. 6,218,023, 5,40,992, 5,302,454, 5,212,246.

Non-phenolic Stabilizers

The non-phenolic stabilizers in the first propylene polymer are selected from hindered amines, hydroxylamines, nitrones, amine oxides, benzofuranones, organic phosphites, phosphonites or mixtures thereof. Non-phenolic stabilizers are described in for example, International Publication No. WO 2009/003930. Preferably, the non-phenolic stabilizers are selected from hindered amines, hydroxylamines, phosphites or mixtures thereof. The non-phenolic stabilizers are typically present in an amount ranging from about 0.001 to about 1 pph, preferably from about 0.005 to about 0.5 pph, and more preferably from about 0.01 to about 0.2 pph.

Processes for Producing the Irradiated Polymer Extrudates

The first propylene polymer to be extruded and irradiated according to the present invention can be produced by a variety of processes, e.g., by combining the propylene polymer and the non-phenolic stabilizer via melt blending, blending below their respective melting points (dry blending), or combinations thereof. Preferably, the first propylene polymer is formed by first dry blending the propylene polymer with the non-phenolic stabilizer, and then extruding the blended material above its melting point. The extrudate produced in the extruder is then subjected to an irradiation treatment. During irradiation, the extrudate can be in the form of a solid, semi-solid or melt. Preferably, the extrudate is a solid, more preferably, the extrudate is in the form of a pellet.

The first propylene polymer is irradiated in a reduced oxygen environment, where the total radiation dosage is preferably about 1 to about 20 Megarad, more preferably 2 to 15 Megarad, most preferably 3 to 12 Megarad. The reduced oxygen environment is maintained during irradiation to prevent chain-scission reactions.

The expression "active oxygen" throughout this disclosure refers to oxygen in a form that will react with the propylene polymer composition, and more particularly with free radicals present in the propylene polymer composition, which are produced from the irradiation process. Active oxygen can include, but is not limited to, molecular oxygen, which is the form of oxygen normally found in air.

The expression "reduced oxygen environment" throughout this disclosure means an active oxygen concentration less than about 15% by volume, preferably less than 5% by volume, and more preferably less than 0.004% by volume, with respect to a total volume of the reduced oxygen environment. Most preferably, the reduced oxygen environment is an inert gas selected from nitrogen, argon, helium and krypton. Typically, the reduced oxygen environment is achieved by replacing part or all of the air in the environment in which the irradiation treatment is conducted by an inert gas, either under vacuum or at positive pressures.

The term "rad" is usually defined as a quantity of ionizing radiation that results in an absorption of 100 ergs of energy per gram of irradiated material, regardless of the source of radiation. With regard to the present invention, the amount of energy absorbed by the propylene polymer composition when it is irradiated usually is not determined. However, the process can be carried out such that the energy absorption from the ionizing radiation can be measured by a conventional dosimeter, which is a measuring device comprising a strip of fabric, film, or combination thereof, wherein the strip of fabric, film, or combination thereof comprises a radiation sensitive dye. This radiation-sensitive dye can be used as an energy absorption sensing means. Accordingly, as used throughout this disclosure, the term "rad" means a quantity of ionizing radiation resulting in an absorption of the equivalent of 100 ergs of energy per gram of fabric, film, or combination thereof comprising the radiation sensitive dye of the dosimeter placed at a surface of the propylene polymer composition being irradiated, regardless of the form of the intermediate polyolefin resin at the time of irradiation.

The radiation from the irradiation treatment can be gamma radiation or electron beam radiation, with the radiation preferably being electron beam radiation. Radiation dosage and dosage rates are adjusted to form a substantial amount of chain scission within the propylene polymer composition, so as to achieve a desired change in melt strength while remaining below the gelation point. Typically, the propylene polymer composition is exposed to the requisite dosage of radiation for a time period ranging from about 0.0001 seconds to several days, the period of exposure being based on the desired total radiation dose, radiation dosage rate, and the type of radiation being used. Radiation dosage rates are typically about 1 megarad to about 10,000 megarad per minute, preferably about 18 to about 2,000 megarads per minute.

The radiation should have sufficient energy to penetrate, to the extent desired, the extrudate of the propylene polymer composition, and preferably to excite the atomic structure of the propylene polymer composition, but preferably not sufficient energy to affect atomic nuclei within the intermediate polyolefin composition. Typically, the radiation is formed from electrons being beamed from an electron generator comprising an accelerating potential of 500-10,000 kilovolts.

After the extrudate of the first propylene polymer has been irradiated, it is maintained in the reduced oxygen environment at temperatures of from 20° C. to 110° C. for a period of time sufficient for a significant amount of long chain branches to form within the irradiated first propylene polymer. A minimum amount of time is needed for sufficient migration of the propylene resin chain fragments formed by the irradiation to free radical sites, where they can reform to complete chains or otherwise form long branches on the polymer chains. Preferably, the irradiated first propylene polymer is maintained in the reduced oxygen environment after exposure to the radiation for about one minute to up to about 48 hours, more preferably, for about one minute to about 24 hours, most preferably 90 minutes to 20 hours.

Following the irradiation treatment, the irradiated extrudate of the first propylene polymer can be subjected to a quenching step while it is in the reduced oxygen environment, to deactivate substantially all free radicals remaining in the irradiated propylene polymer composition. The quenching step includes raising the temperature of the irradiated extrudate of the first propylene polymer, while in the reduced oxygen environment, to temperatures ranging from about 20° C. to about 200° C., more preferably from about 100° C. to about 150° C. Conventional free radical traps, such as methyl mercaptan, can optionally be used during the quenching step.

The irradiation step results in an increase in the melt tension of the irradiated first propylene polymer. Preferably, the melt tension of the irradiated extrudate of the first propylene polymer is greater than 0.5 cN, preferably greater than 1 cN, more preferably, 3.5 to 40 cN, most preferably 20 to 35 cN.

Process for Blending the Irradiated Extrudate and Non-Irradiated Polymer.

The irradiated extrudate of the first propylene polymer is blended with the non-irradiated second propylene polymer below the melting points of both components. Preferably, the blending is performed at room temperature. Blending is conducted in mixing equipment wellknown to those skilled in the art, such as a tumble blender, ribbon blender, henschel blender, or by co-feeding irradiated extrudate through loss-in-weight (or gravimetric) feeders at the extruder. In this way, suitable dispersion of the high melt strength material into the non-irradiated material can be obtained without compounding the blend components. Preferably, the blending is conducted by co-feeding irradiated extrudate through loss-in-weight (or gravimetric) feeders at the extruder.

Additives, Stabilizers, and Fillers

The irradiated extrudate of the first propylene polymer can further comprise, in addition to the non-phenolic stabilizer, conventional additives and stabilizers well known in the art. In this regard, the irradiated first propylene polymer can additionally comprise at least one additive, stabilizer, filler, or combination thereof. It will be understood by those in the art that additives is a broad term that encompasses stabilizers and fillers. Additives, stabilizers, and fillers can include, but are not limited to, UV absorbers, metal deactivators, peroxide scavengers, basic co-stabilizers, acid scavengers, pigments, catalysts, optical brighteners, antistatic agents, and mixtures thereof, which can be added in amounts well known to those skilled in the art. However, any additives, stabilizers, fillers, or the like, added to the first propylene polymer should not substantially negatively affect the improved melt tension of the irradiated first propylene polymer described in the present invention. In particular, the total amount of any phenolic stabilizers present in the irradiated extrudate of the first propylene polymer is at most 500 ppm based on the polymer, more preferably less than 150 ppm, more preferably less than 100 ppm, and more preferably less than 50 ppm. Most preferably, the irradiated extrudate of the first propylene polymer is free of phenolic stabilizers.

The non-irradiated second propylene polymer can comprise conventional stabilizers and additives well known in the art, in amounts consistent with maintaining the ARSWP of the blend of the irradiated extrudate of the first propylene polymer and the non-irradiated second propylene polymer within the desired range. Preferably, the non-irradiated second propylene polymer contains stabilizers selected from hindered phenols, hindered amines, hydroxylamines and phosphites or mixtures thereof, more preferably, selected from hindered phenols, phosphites, and mixtures thereof. The additives are preferably present in an amount from 0.05 pph to 0.22 pph, more preferably, from 0.05 pph to 0.2 pph, still more preferably from 0.1 to 0.15 pph. In other embodiments, the stabilizers will be present in an amount no more than 0.22 pph, alternatively, no more than 0.20 pph, alternatively no more than 0.17 pph, alternatively no more than 0.15 pph, alternatively no more than 0.10 pph. It will be understood that combinations of these ranges can also be employed. Alternatively, the combination of hindered phenols, hindered amines and phosphites together are present in an amount from 0.05 to 0.15 pph, alternatively from 0.075 to 0.125 pph, alternatively 0.125 pph or less, alternatively 0.10 pph or less.

Phase Morphology of the Blend

The blend of the irradiated extrudate of the first propylene polymer and the non-irradiated second propylene polymer has a co-continuous structure. For the purposes of this specification, the term co-continuous structure shall mean the coexistence of at least two continuous structures within the same volume.

It has unexpectedly been found that the claimed blend compositions having a co-continuous structure and an averaged rubber phase size width (ARPSW) of ≦3.0 micron provides good extrusion coating performance in terms of line speed and film quality. Preferably, the ARPSW is 0.5 to 2.5 micron. At higher values of ARPSW, where the rubber particles are less-well distributed in the polymer composition, extrusion coating line speeds must be reduced due to a deterioration in the ability to process the film, e.g., an increase in neck-in.

Extrusion Coating Process

The extrusion coating process of the invention using the blend of the irradiated extrudate of the first propylene polymer and the non-irradiated second propylene polymer is preferably conducted at a die temperature of 500 F to 590 F, more preferably 500 F to 570 F; a die opening of 20 mils to 35 mils, more preferably 22 mils to 28 mils; an air gap of 5 inches to 12 inches, more preferably, 6 inches to 10 inches; and at a coating thickness of 0.3 mils to 1.5 mils, more preferably 0.5 mils to 1.0 mils. Line speeds for the extrusion coating process are preferably 1000 feet per minute to 2500 feet per minute, more preferably 1200 feet per minute to 2000 feet per minute. The types of rolls used in the extrusion coating process are preferably textured or polished. More preferably, the type of rolls used is textured.

Test Methods

Unless otherwise specified, the properties of the polymer materials and compositions that are set forth in the following examples have been determined according to the following test methods:

ARPSW

SEM specimens cut from molded samples were cryogenically microtomed and methyl-cyclohexene etched prior to Au-coating. SEM images were obtained from Hitachi S3500 SEM at an accelerating voltage of 5 kV. Average rubber particle size width (ARPSW) was determined by averaging the width of each rubber phase along the vertical direction from three sections.

Melt Flow Rate ("MFR")

ASTM D1238, measured at 230° C., 2.16 kg, units of dg/min.

Melt Tension ("MT")

Melt tension is measured on a Goettfert Rheotens apparatus at 200° C. The Rheoten apparatus consists of two counter-rotating wheels mounted on a balance beam. A melt strand of the polymer is extruded from a capillary die and pulled between the counter-rotating wheels until the strand ruptures. The pulling velocity of the counter-rotating wheels is initially constant to establish a baseline of force, with a constant acceleration then applied to the strand until the strand ruptures. The maximum force measured before rupture during the test is taken as the melt tension. The extensibility of the melt is represented by the velocity at rupture.

Xylene Insolubles ("XI")

The weight percent of polymer soluble in xylene at room temperature is determined by placing 2.5 g of polymer in 250 ml of xylene at room temperature in a vessel equipped with a stirrer, and heating at 135° C. with agitation for 20 minutes to dissolve the whole polymer. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached.

Film Neck-in

Film neck-in, i.e., the difference between the width of the extrusion die opening and the width of the coating on the substrate, was measured with a ruler on the paper-coated film.

Components

The following components are used in the Examples disclosed herewith:

Adflex® Z 108 S is a thermoplastic polyolefin produced by Catalloy process technology commercially available from Equistar Chemicals, LP.

Adflex® KS084P is a thermoplastic polyolefin produced by Catalloy process technology commercially available from Equistar Chemicals, LP.

Irganox 1010 is a Sterically hindered phenolic antioxidant ("Pentaerythritol Tetrakis(3-(3,5-di-tert-butyl-4-hydroxyphenyl)propionate)") commercially available from BASF.

Irgafos 168 is a phosphite based stabilizer ("Tris(2,4-di-tert-butylphenyl)phosphate").

Chimassorb 944 is a hindered amine stabilizer commercially available from BASF.

Irgastab FS042 is a hindered amine stabilizer commercially available from BASF.

DHT-4A is a stabilizer comprised of Hydrotalcite available from Kyowa chemical industry.

EXAMPLES

The following examples are illustrative of preferred processes and are not intended to be limitations thereon. All references to parts, percentages and ratios in this specification refer to percentages by weight of the final composition prepared, and unless otherwise indicated, all totals equal 100% by weight.

Comparative Example 1

An extrusion-coated film was prepared from a polymer composition containing 85 wt % of a non-irradiated propylene polymer and 15 wt % of an irradiated extrudate of a propylene polymer P-2.

The non-irradiated propylene polymer is Adflex® KS084P and contains 31 wt % of a propylene homopolymer, with xylenes greater than 80% and 69 wt % of an ethylene-propylene rubber (EPR) containing 28 wt % ethylene, and has a MFR of 30 dg/min. The overall ethylene content of the non-irradiated second propylene polymer is 19.4 wt %.

Accordingly, the composition of the non-irradiated propylene polymer is as follows:

(i) 31 wt % propylene homopolymer, XI greater than 80%,
(ii) 10.6 wt % EPR crystalline, which is xylene insoluble,
(iii) 58.4 wt % EPR amorphous xylene soluble (XS), IV=3.8 dl/g, where (ii)/(iii)=0.18.

Furthermore, after preparation, the reactor product has a MFR of 0.75 g/10 min. Thereafter it is formed into a final pellet having an MFR of 30 g/10 min with Lupersol 101.

The additive package in the non-irradiated propylene polymer (1) 0.1 pph Irganox 1010,
(2) 0.1 pph Irgafos 168,
(3) 0.1 pph Calcium Stearate.

The irradiated extrudate was prepared from a propylene homopolymer having an MFR of 0.14 dg/min and XI of 97.8 wt % compounded with 0.1 pph of Chimassorb 944, commercially available from BASF, and 0.03 pph of calcium stearate, on a JSW extruder to form an extrudate with a melt flow rate of 0.6 dg/min. The extrudate was irradiated in an inert atmosphere, and then thermally treated at 80° C. for 1.5 hours and at 140° C. for an additional 1.5 hrs. The melt tension of the irradiated extrudate was 34 cN and the MFR was 1.7 dg/min.

The polymer composition was formed by dry blending the irradiated and non-irradiated materials below their melting point in a drum blender. The polymer composition was extrusion-coated onto 4-mil Craft paper using a 4.5-inch, 24:1 L/D, 150 horsepower Beloit single screw extruder with a coat hanger type die at a web width of 30 inches. Conditions for the extrusion coating process: air gap, die temperature, neck-in, roll type, maximum line speed, and coating thickness, as well as the film properties are summarized in Table 1. The phase morphology of the sample is shown in FIG. 1. The ARSWP of the composition was 3.5μ.

Example 2

Figure 2:
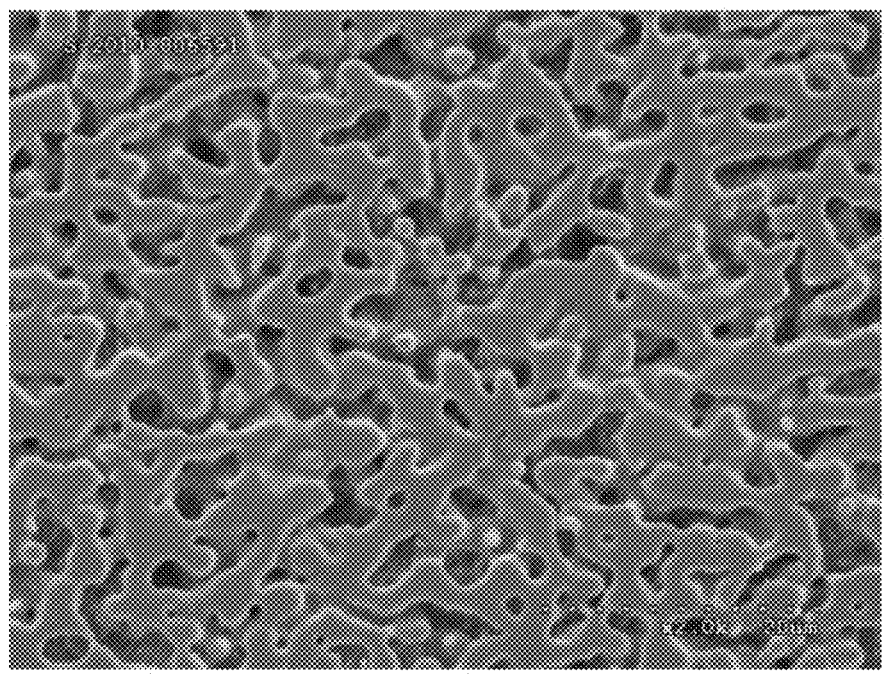
FIG. 2 illustrates a SEM micrograph of a cross-section of Example 2, showing its phase morphology.

An extrusion-coated film was prepared as in Comparative Example 1 except that the additive package in the non-irradiated propylene polymer is
(1) 0.05 pph Irganox 1010
(2) 0.05 pph Irgafos 168
(3) 0.05 pph DHT4A Extrusion conditions and film properties are summarized in Table 1. The phase morphology of the sample is shown in FIG. 2. The ARSWP of the composition was 2.7μ.

Accordingly, it is surprisingly shown that decreasing the additive package improved the phase morphology of the composition.

Example 3

An extrusion-coated film was prepared as in Comparative Example 1 except that the non-irradiated propylene polymer is Adflex® Z 108 S and contains 31 wt % of a propylene/ethylene random copolymer containing 3.8 wt % ethylene and 69 wt % of an ethylene-propylene rubber containing 29 wt % ethylene, and has a MFR of 27 dg/min. The overall ethylene content of the non-irradiated second propylene polymer is 21.6 wt %

Accordingly, the composition of the non-irradiated propylene polymer is as follows:
(i) 31 wt % C3-C2 random copolymer (3.8% C2), with XI greater than 80%,
(ii) 6.9 wt % EPR crystalline, which is which is xylene insoluble,
(iii) 62.1 wt % EPR amorphous XS, IV=3.8 dl/g, where (ii)/(iii)=0.11

Furthermore, after preparation, the reactor product has a MFR of 0.6 g/10 min. Thereafter it is formed into a final pellet having a MFR of 27 g/10 min with Lupersol 101.

The additive package in the non-irradiated propylene polymer is:
(1) 0.05 ppm FS042
(2) 0.05 ppm Chimmasorb 944
(3) 0.05 ppm Calcium Stearate.

Figure 3:
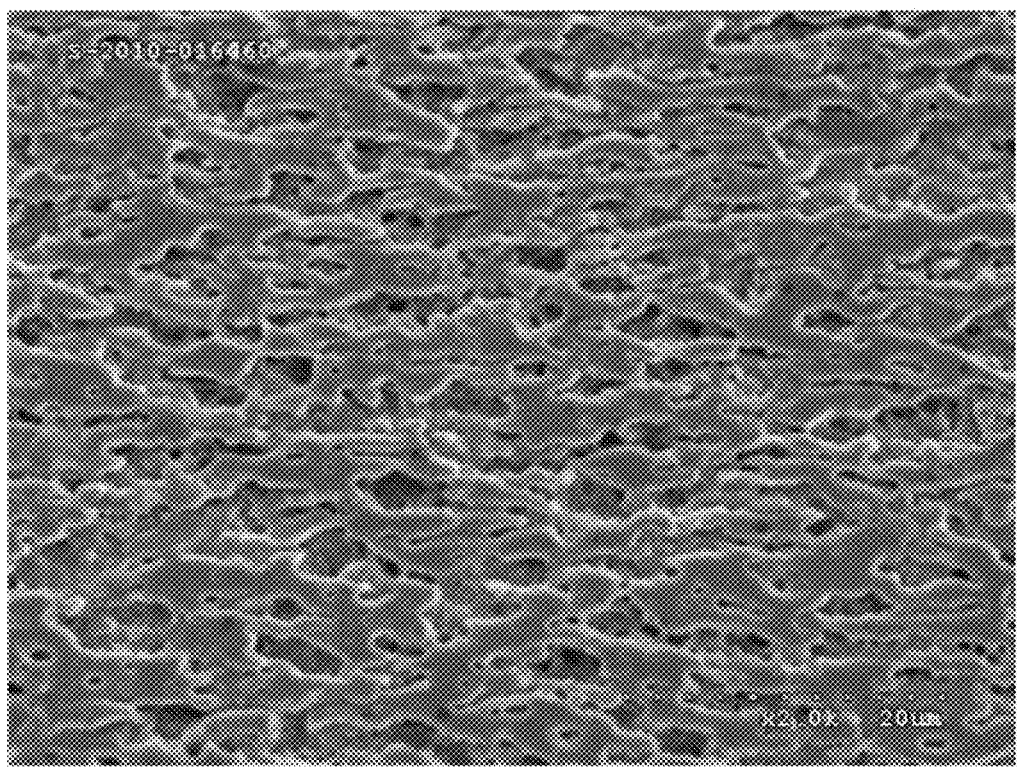
FIG. 3 illustrates a SEM micrograph of a cross-section of Example 3, showing its phase morphology.

Extrusion conditions and film properties are summarized in Table 1. The phase morphology of the sample is shown in FIG. 3. The ARSWP of the composition is 1.3μ.

TABLE 1

| | Comparative Ex. 1 | Ex. 2. | Ex. 3 |
|---|---|---|---|
| Die opening, mil | 25 | 25 | 25 |
| Coating thickness, mil | 1 | 1 | 1 |
| Air Gap, inch | 6.5 | 6.5 | 10 |
| Die Temp., ° F. | 570 | 570 | 500 |
| Roll type | Textured | Textured | Textured |
| Max line speed, fpm | <800 | >1800 | >1400 |
| Neck-in | 15.4 | 7.3 | 10.8 |

The results in Table 1 demonstrate that the claimed extrusion coating process produces films having good quality at high line speed. Furthermore, with respect to Example 3, in spite of the higher air gap, the composition showed a lower neck-in than comparative example 1. This can be attributed to the much smaller ARSWP in example 3.

All incorporations by reference throughout this disclosure are done within the spirit and scope of the disclosure herein, and are not meant to limit the disclosure or scope of the following claims.

Additionally, the present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

We claim:

1. A composition comprising a blend of an irradiated first propylene polymer comprising a non-phenolic stabilizer and a non-irradiated second propylene polymer,
wherein the irradiation of the first propylene polymer was conducted in a reduced oxygen environment, and
wherein the second propylene polymer is selected from:
(e) an olefin polymer composition comprising:
(i) about 10 parts to about 60 parts by weight of a crystalline propylene homopolymer having xylene insolubles of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and xylene insolubles greater than about 60%;
(ii) about 3 parts to about 25 parts by weight of a copolymer of ethylene and propylene, or ethylene and a $C_4$-$C_{10}$ α-olefin, where the copolymer is insoluble in xylene at ambient temperature; and
(iii) about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;
wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages, (f) a thermoplastic olefin comprising:
(i) about 10% to about 60% by weight of a propylene homopolymer having xylene insolubles of at least 80%, or a crystalline copolymer selected from the group consisting of (a) ethylene and propylene, (b) ethylene, propylene and a $C_4$-$C_{10}$ α-olefin, and (c) ethylene and a $C_4$-$C_{10}$ α-olefin, the crystalline copolymer comprising a propylene content greater than 85% by weight and xylene insolubles greater than 60%;
(ii) about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and
(iii) about 3% to about 40% by weight of a copolymer of ethylene and propylene or a copolymer of ethylene and an α-olefin, wherein the copolymer is insoluble in xylene at ambient temperature; or
(g) mixtures thereof,
and wherein additives in the non-irradiated propylene polymer are present in the composition at no more than 0.22 pph.

2. The composition of claim 1 wherein the irradiated first propylene polymer and the non-irradiated second propylene polymer were blended at a temperature below the melting point of the first and second propylene polymers.

3. The composition of claim 1 wherein a melt phase extrudate of the composition has an ARPSW of ≦3.0 micron after melt phase extrusion.

4. The process of claim 1 wherein the non-phenolic stabilizer is selected from hindered amines, hydroxylamines, phosphites or mixtures thereof.

5. The process of claim 1 wherein the non-phenolic stabilizer is present in an amount from about 0.005 to about 0.5 pph.

6. A process comprising extruding a blend of an irradiated first propylene polymer comprising a non-phenolic stabilizer and a non-irradiated second propylene polymer,
wherein the irradiation of the first propylene polymer was conducted in a reduced oxygen environment, and
the irradiated first propylene polymer and the non-irradiated second propylene polymer were blended at a temperature below the melting point of the first and second propylene polymers,
wherein the second propylene polymer is selected from:
(e) an olefin polymer composition comprising:
(i) about 10 parts to about 60 parts by weight of a crystalline propylene homopolymer having xylene insolubles of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and xylene insolubles greater than about 60%;
(ii) about 3 parts to about 25 parts by weight of a copolymer of ethylene and propylene, or ethylene and a $C_4$-$C_{10}$ α-olefin, where the copolymer is insoluble in xylene at ambient temperature; and
(iii) about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;
wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages,
(f) a thermoplastic olefin comprising:
(i) about 10% to about 60% by weight of a propylene homopolymer having xylene insolubles of at least 80%, or a crystalline copolymer selected from the group consisting of (a) ethylene and propylene, (b) ethylene, propylene and a $C_4$-$C_{10}$ α-olefin, and (c) ethylene and a $C_4$-$C_{10}$ α-olefin, the crystalline copolymer comprising a propylene content greater than 85% by weight and xylene insolubles greater than 60%;
(ii) about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and
(iii) about 3% to about 40% by weight of a copolymer of ethylene and propylene or a copolymer of ethylene and an α-olefin, wherein the copolymer is insoluble in xylene at ambient temperature; or
(g) mixtures thereof,
and the blend has an ARPSW of ≦3.0 micron after melt phase extrusion.

7. The process of claim 6, wherein additives in the non-irradiated propylene polymer are present in the composition at no more than 0.22 pph.

8. The process of claim 6, wherein the blend has an ARPSW from 0.5 to 2.5 micron.

9. The process of claim 6, wherein the blend is extruded to form a film.

10. The process of claim 9 further comprising coating the film onto a substrate.

11. The process of claim 10 wherein the substrate is selected from paper, paperboard, fabrics or metal foils.

12. The process of claim 6 wherein the blend comprises 5 to 95 wt % of the irradiated first propylene polymer and 5 to 95 wt % of the non-irradiated second propylene polymer.

13. The process of claim 6 wherein the melt flow rate of the first propylene polymer is 1 dg/min to 15 dg/min and the melt flow rate of the second propylene polymer is 1 dg/min to 35 dg/min.

14. The process of claim 6 wherein the first propylene polymer is selected from:
(a) a crystalline propylene homopolymer having a xylene insolubles greater than 80%,
(b) a crystalline random copolymer comprising propylene and an olefin selected from the group consisting of ethylene and a $C_4$-$C_{10}$ α-olefin, having xylene insolubles greater than 80%, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight, (c) a crystalline random terpolymer comprising propylene and two olefins selected from the group consisting of ethylene, $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight, or (d) mixtures thereof.

15. The process of claim 6 wherein the non-phenolic stabilizer is selected from hindered amines, hydroxylamines, phosphites or mixtures thereof.

16. The process of claim 15 wherein the non-phenolic stabilizer is present in an amount from about 0.005 to about 0.5 pph.

17. The process of claim 12 wherein 70 to 90 wt % of the second propylene polymer and 10 to 30 wt % of the irradiated first propylene polymer composition are blended.

18. The process of claim 17 wherein 75 to 85 wt % of the second propylene polymer and 15 to 25 wt % of the irradiated first propylene polymer composition are blended.

19. A process comprising:
blending an irradiated first propylene polymer comprising a non-phenolic stabilizer, and a non-irradiated second propylene polymer, at a temperature below the melting point of the first and second propylene polymers, thereby forming a polymer blend,
wherein the irradiation of the first propylene polymer was conducted in a reduced oxygen environment;
extruding the polymer blend to form a film; and
coating the film onto a substrate selected from paper, paperboard, fabrics or metal foils;
wherein the second propylene polymer is selected from:
(e) an olefin polymer composition comprising:
(i) about 10 parts to about 60 parts by weight of a crystalline propylene homopolymer having xylene insolubles of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and xylene insolubles greater than about 60%;
(ii) about 3 parts to about 25 parts by weight of a copolymer of ethylene and propylene, or ethylene and a $C_4$-$C_{10}$ α-olefin, where the copolymer is insoluble in xylene at ambient temperature; and
(iii) about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;

wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages,
(f) a thermoplastic olefin comprising:
(i) about 10% to about 60% by weight of a propylene homopolymer having xylene insolubles of at least 80%, or a crystalline copolymer selected from the group consisting of (a) ethylene and propylene, (b) ethylene, propylene and a $C_4$-$C_{10}$ α-olefin, and (c) ethylene and a $C_4$-$C_{10}$ α-olefin, the crystalline copolymer comprising a propylene content greater than 85% by weight and xylene insolubles greater than 60%;
(ii) about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and
(iii) about 3% to about 40% by weight of a copolymer of ethylene and propylene or a copolymer of ethylene and an α-olefin, wherein the copolymer is insoluble in xylene at ambient temperature; or
(g) mixtures thereof,
and the blend has an ARPSW of ≦3.0 micron after melt phase extrusion.

20. A process for preparing a polymer composition comprising:
blending an irradiated first propylene polymer comprising a non-phenolic stabilizer with a non-irradiated second propylene polymer,
wherein the irradiation of the first propylene polymer was conducted in a reduced oxygen environment,
wherein the irradiated first propylene polymer and the non-irradiated second propylene polymer were blended at a temperature below the melting point of the first and second propylene polymers, and
wherein the blend has a viscosity retention of 20 to 35%;
wherein the irradiation of the first propylene polymer was conducted in a reduced oxygen environment, and
wherein the second propylene polymer is selected from:
(e) an olefin polymer composition comprising:
(i) about 10 parts to about 60 parts by weight of a crystalline propylene homopolymer having xylene insolubles of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and xylene insolubles greater than about 60%;
(ii) about 3 parts to about 25 parts by weight of a copolymer of ethylene and propylene, or ethylene and a $C_4$-$C_{10}$ α-olefin, where the copolymer is insoluble in xylene at ambient temperature; and
(iii) about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;

wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages, (f) a thermoplastic olefin comprising:
  (i) about 10% to about 60% by weight of a propylene homopolymer having xylene insolubles of at least 80%, or a crystalline copolymer selected from the group consisting of (a) ethylene and propylene, (b) ethylene, propylene and a $C_4$-$C_{10}$ α-olefin, and (c) ethylene and a $C_4$-$C_{10}$ α-olefin, the crystalline copolymer comprising a propylene content greater than 85% by weight and xylene insolubles greater than 60%;
  (ii) about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and
  (iii) about 3% to about 40% by weight of a copolymer of ethylene and propylene or a copolymer of ethylene and an α-olefin, wherein the copolymer is insoluble in xylene at ambient temperature; or (g) mixtures thereof, and wherein additives in the non-irradiated propylene polymer are present in the composition at no more than 0.22 pph.

* * * * *